US012283753B2

(12) United States Patent
Makiyama et al.

(10) Patent No.: US 12,283,753 B2
(45) Date of Patent: Apr. 22, 2025

(54) DUAL POLARIZED FOLDED DIPOLE ELEMENT AND ANTENNA

(71) Applicant: DKK Co., Ltd., Tokyo (JP)

(72) Inventors: Sadayuki Makiyama, Tokyo (JP); Hirotaka Ogura, Tokyo (JP)

(73) Assignee: DKK Co., Ltd. (JP)

( * ) Notice: Subject to any disclaimer, the term of this patent is extended or adjusted under 35 U.S.C. 154(b) by 169 days.

(21) Appl. No.: 18/153,444

(22) Filed: Jan. 12, 2023

(65) Prior Publication Data

US 2023/0238714 A1 Jul. 27, 2023

(30) Foreign Application Priority Data

Jan. 21, 2022 (JP) ................................ 2022-007806

(51) Int. Cl.
*H01Q 9/26* (2006.01)
*H01Q 5/48* (2015.01)
*H01Q 21/24* (2006.01)

(52) U.S. Cl.
CPC ............... *H01Q 21/24* (2013.01); *H01Q 5/48* (2015.01); *H01Q 9/26* (2013.01)

(58) Field of Classification Search
CPC ............ H01Q 5/48; H01Q 9/26; H01Q 21/24; H01Q 21/245; H01Q 21/26
See application file for complete search history.

(56) References Cited

U.S. PATENT DOCUMENTS

| | | | | |
|---|---|---|---|---|
| 2,338,564 A * | 1/1944 | Aram | H01Q 21/26 343/803 |
| 2004/0155831 A1 | 8/2004 | Goebel et al. | |
| 2008/0074339 A1 | 3/2008 | Lee et al. | |
| 2009/0179814 A1 * | 7/2009 | Park | H01Q 21/26 343/810 |
| 2010/0238087 A1 | 9/2010 | Jung et al. | |

(Continued)

FOREIGN PATENT DOCUMENTS

| | | |
|---|---|---|
| CN | 205282659 U | 6/2016 |
| CN | 209133685 U | 7/2019 |
| JP | 2001-196846 A | 7/2001 |

(Continued)

OTHER PUBLICATIONS

Search Report for U.K. Application No. 2300473.2 dated Jul. 10, 2023, 1 page.

(Continued)

*Primary Examiner* — Daniel Munoz
(74) *Attorney, Agent, or Firm* — Lerner David LLP

(57) ABSTRACT

Provided is a dual polarized folded dipole element 1 including: four center portions 20 arranged adjacent to each other; and an element portion including two parallel wire portions 22, 23 extending in parallel to each other from different adjacent two of the center portions 20 and a short circuit portion 24 that short-circuits each two parallel wire portions 22, 23 at a distal end, in which: adjacent two of the center portions are physically connected to each other by the element portion; and the element portion extends in substantially the same plane in four directions from the center portions 20 with an angle of 90° therebetween. Also provided are antennae 10 and 10' including the dual polarized folded dipole element 1.

9 Claims, 16 Drawing Sheets

(56) References Cited

U.S. PATENT DOCUMENTS

| | | | | |
|---|---|---|---|---|
| 2019/0081413 | A1 | 3/2019 | Xia et al. | |
| 2021/0305722 | A1* | 9/2021 | Zhang | H01Q 21/26 |

FOREIGN PATENT DOCUMENTS

| | | | |
|---|---|---|---|
| JP | 2005-203841 | A | 7/2005 |
| JP | 2016-119551 | A | 6/2016 |
| JP | 2017508402 | A | 3/2017 |
| WO | 2007114620 | A1 | 10/2007 |
| WO | 2015142743 | A1 | 9/2015 |

OTHER PUBLICATIONS

"Nyumon Antenna oyobi Denpa no Tsutawarikata (Introduction to antennae and how signals are transmitted)", Zaidanhojin Denkitsushin Shinkou Kai (Foundation of Electrical Communication Society), First edition, Apr. 2007, pp. 51-53, pp. 77-79 with its English translation.

* cited by examiner

DUAL POLARIZED FOLDED DIPOLE ELEMENT AND ANTENNA

CROSS-REFERENCE TO RELATED APPLICATIONS

The present application claims priority from Japanese Patent Application No. 2022-007806, filed Jan. 21, 2022, the disclosure of which is incorporated herein by reference.

BACKGROUND OF THE INVENTION

Field of the Invention

The present invention relates to a base station antenna of a mobile communication system or the like, and in particular, relates to a dual polarized dipole element and to an antenna including the same.

Description of Related Art

In a mobile communication system, in order to operate by using a plurality of broadband frequency bands, an antenna is used in which radiating elements for respective frequency bands are integrally accommodated. In addition, since a plurality of radiating elements are used for improving the communication rate by MIMO communication, the radiating elements are close to each other inside the antenna, thus affecting the electrical characteristics such as directivity.

FIG. 13(A) illustrates an example of a conventional dual polarized dipole element 100'. Here, the dual polarized dipole element 100' includes two orthogonal radiating elements 110*a*' and 110*b*' having a half-wave dipole structure. The radiating elements 110*a*' and 110*b*' are orthogonal to each other in the vicinity of a center portion of each one. A power feed unit (not illustrated) provided in the vicinity of the center of the orthogonal intersection feeds power to each of the radiating elements 110*a*' and 110*b*', whereby the dual polarized dipole element 100' can be used as a low-band radiating element (900 MHz band). The conventional ±45° dual polarized dipole element 100' includes two orthogonal radiating elements 110*a*' and 110*b*' having the half-wave dipole structure, the radiating elements 110*a*' and 110*b*' are arranged to extend in a polarized wave direction (±45° direction indicated by two arrows on the left side of FIG. 13(A)). FIG. 13(B) shows an electric current distribution in a case in which power is fed to the dual polarized dipole element 100' in the polarized wave direction (±45° direction). It can be seen from FIG. 13(B) that, in the case in which power is fed in the polarized wave direction, electric current is distributed heavily in the radiating element 110*a*' extending in the polarized wave direction of the dual polarized dipole element 100'. In general, impedance of the conventional dual polarized dipole element 100' having the half-wave dipole structure is about 73Ω (this is described in, for example, page 51 of Non-patent Literature 1). Here, as a configuration of the conventional dual polarized dipole element, in a case in which a width of each of the two radiating elements 110*a*' and 110*b*' is 20 mm in the dual polarized dipole element 100' in a printed substrate corresponding to the low band (900 MHz band), for example, impedance of the conventional dual polarized dipole element 100' is about 60Ω. FIG. 13(C) illustrates return loss of the conventional dual polarized dipole element 100'. As indicated by a dotted line in FIG. 13(C), with the conventional dual polarized dipole element 100', the return loss of no greater than −10 dB is in a range from 720 to 780 MHz, and fractional bandwidth is 8%. Note that, such a fractional bandwidth can be broadened by, for example, changing the shape or the impedance of the radiating elements 110*a*' and 110*b*'.

Next, FIG. 14 illustrates a conventional dual polarized antenna including four sets of high-band radiating elements 120*a* to 120*d* per the conventional dual polarized dipole element 100' of FIG. 13(A), in which the four sets are attached to the reflection portion 130. In FIG. 14, the four high-band radiating elements 120*a* to 120*d* are arranged adjacent to respective four radiating elements 110*a*' to 110*d*' of the conventional dual polarized dipole element 100'. Here, in the conventional dual polarized antenna of FIG. 14, the four radiating elements 110*a*' and 110*b*' of the dual polarized dipole element 100' corresponding to the low-band radiating elements and the high-band radiating elements 120*a* to 120*d* are all arranged in the polarized wave direction (±45° direction) (in other words, in the conventional dual polarized antenna of FIG. 14, the low-band radiating elements 110*a*' and 110*b*' and the high-band radiating elements 120*a* to 120*d* overlap each other in the radiation directions). Therefore, in the conventional dual polarized antenna of FIG. 14, the electrical characteristics such as directivity of the antenna are affected.

Next, FIG. 15(A) illustrates an example of a conventional dual polarized antenna including sets of other conventional dual polarized antennae in which the low-band radiating elements 110*a*" and 110*b*" do not overlap in the radiation directions of the four elements 120*a*' to 120*d*' constituting the high-band radiating element 120*a*, in which the four sets are attached to the reflection portion 130. Examples of another such conventional dual polarized antenna and the dual polarized antenna are disclosed in, for example, FIG. 4 of Patent Literature 1. Here, the configuration employing the conventional VH dual polarized antenna and a hybrid circuit shown in FIG. 15(A) is obtained by rotating the conventional dual polarized dipole element 100' of FIG. 14 by 45° with respect to the polarized wave direction, whereby the influence from the low-band radiating elements 110*a*" and 110*b*" is reduced. However, in order to polarize by ±45° with the conventional VH dual polarized antenna shown in FIG. 15 (A), it is necessary to use the hybrid circuit shown in FIG. 15(B) to input a phase signal of 0° to the low-band radiating element 110*a*" and synthesize to the radiating element 110*b*" with a phase difference of 180°. Therefore, the other conventional dual polarized antenna of FIG. 15(A) has a more complex configuration than the conventional dual polarized antenna of FIG. 14. In addition, due to employing the hybrid circuit, a coupling amount between polarized waves of the other conventional dual polarized antenna of FIG. 15(A) is affected by a characteristic of a coupling amount between ports of the hybrid circuit. In addition, in the case of a wide band, the phase amount of the hybrid varies depending on the frequency, whereby the synthesized directivity varies. Therefore, in the other conventional dual polarized antenna of FIG. 15(A), typically, the coupling amount between polarized waves and the electrical characteristics of the directivity tend to be deteriorated compared to the dual polarized antenna not employing the hybrid circuit.

Next, FIG. 16(A) illustrates an example of a conventional X-shaped dual polarized dipole element 200 in which spaces (indicated by four dotted line circles) for arranging high-band radiating elements in the polarized wave direction (±45° direction) are secured, without employing the hybrid circuit. Here, in the conventional X-shaped dual polarized dipole element 200, two X-shaped low-band radiating elements 210*a* and 210*b* are arranged orthogonally to each other. FIG. 16(B) shows an electric current distribution in a case in which power is fed to the conventional X-shaped dual polarized dipole element 200 in the polarized wave direction (direction indicated by an arrow in FIG. 16(A)). According to FIG. 16(B), in the conventional X-shaped dual polarized dipole element 200, in a similar manner to the electric current distribution in FIG. 13(B), the electric current is heavily distributed in an element excited and fed from a feeding point (the L-shaped low-band radiating element 210*a* in FIG. 16(A)). In addition, in the conventional X-shaped dual polarized dipole element 200, a slight electric current distribution due to coupling is observed, not only in an element excited and fed from a feeding point (the X-shaped low-band radiating element 210*a* in FIG. 16(A)), but also in another element adjacent thereto (the X-shaped low-band radiating element 210*b* in FIG. 16(A)). Such a conventional X-shaped dual polarized dipole element 200 has impedance of about 60Ω, and can obtain a broader-band characteristic than the general dipole element. In addition, a parasitic element can be disposed in order to further broaden the band, while the spaces in the polarized wave direction are retained. FIG. 16(C) illustrates return loss of the conventional X-shaped dual polarized dipole element 200. As indicated by a dotted line in FIG. 16(C), with the conventional X-shaped dual polarized dipole element 200, the return loss of no greater than −10 dB is in a range from 670 to 790 MHz, and fractional bandwidth is 16%.

Next, FIG. 17(A) illustrates another conventional X-shaped dual polarized dipole element 300, which is the conventional X-shaped dual polarized dipole element 200 to which a parasitic element 240 is added for further broadening the band. In addition, the right-side drawing in FIG. 17(A) shows a cross-sectional view of the other conventional X-shaped dual polarized dipole element 300, when the cross section shown in the left-side drawing in FIG. 17(A) is viewed from X' direction. Here, the parasitic element 240 has a cross shape extending respectively on the two X-shaped low-band radiating elements 210*a* and 210*b*. Furthermore, the two X-shaped low-band radiating elements 210*a* and 210*b* are arranged between the parasitic element 240 and the reflection portion 130.

FIG. 17(C) illustrates a simplified electric current distribution in the conventional X-shaped dual polarized dipole element 200 illustrated in FIG. 16(B). Here, FIG. 17(C) illustrates an electric current (an arrow in solid line) flowing in the element excited and fed from the feeding point (the X-shaped low-band radiating element 210*a* in FIG. 16(A)), and an electric current (undesired wave: an arrow in dotted line) flowing in another element adjacent thereto (the X-shaped low-band radiating element 210*b* in FIG. 16(A)). Typically, the parasitic element 240 contains copper or aluminum. Therefore, in the case of the conventional X-shaped dual polarized dipole element 300 in FIG. 17(A), an electric current of a polarized wave component of the radiating element excited from the feeding point and an electric current (undesired wave) excited by coupling from another radiating element arranged adjacent thereto are synthesized in the parasitic element 240.

FIG. 18 is a graph showing return loss of the conventional X-shaped dual polarized dipole element 300 shown in FIG. 17(A). In the conventional X-shaped dual polarized dipole element 300, the return loss of no greater than −10 dB (indicated by a dotted line in FIG. 18) is in a range from 680 to 770 MHz, and fractional bandwidth is 12%. Such a value of the fractional bandwidth (12%) is less than the value of the fractional bandwidth (16%) of the conventional X-shaped dual polarized dipole element 200 without the parasitic element 240 shown in FIG. 16(A). Such a reduction in the fractional bandwidth is considered to be due to the electric current (undesired wave) flowing in the X-shaped low-band radiating element 210*b* in FIG. 16(A) being synthesized in the parasitic element 240. As a result, the impedance (60Ω) in the conventional dual polarized dipole element 200 shown in FIG. 17 (A) is slightly reduced to about 40Ω. The reduced peak of the excitation by the parasitic element 240 (corresponding to the peak observed in the vicinity of 970 MHz in FIG. 18) is considered to be due to coupling of the electric current excited by the low-band radiating element 210*b* to the parasitic element 240, whereby the effect of broadening of the fractional bandwidth due to excitation of the parasitic element 240 is less likely to be obtained. Therefore, it is difficult to achieve broadening of the band by excitation of the parasitic element 240, even if the configuration in which the parasitic element 240 is simply added to the conventional X-shaped dual polarized dipole element 200 shown in FIG. 17(A) is employed.

CITATION LIST

Patent Literature

Patent Literature 1: Japanese Patent Application Publication No. 2017-508402

Non-Patent Literature

Non-patent Literature 1: *"Nyumon Antenna oyobi Denpa no Tsutawarikata* (Introduction to antennae and how signals are transmitted)", *Zaidanhojin Denkitsushin Shinkou Kai* (Foundation of Electrical Communication Society), First edition, April, 2007

Therefore, a dual polarized antenna is desired, with which effects on electrical characteristics, such as directional disturbance, are not likely and that has a broadband characteristic, even if a radiating element of high-band or other frequency bands is arranged close to a low-band radiating element in a case in which the polarized wave direction is ±45°.

SUMMARY OF INVENTION

In order to solve the aforementioned problem, the present invention provides a dual polarized folded dipole element including two L-shaped folded dipole elements.

In other words, the present invention provides a dual polarized folded dipole element comprising: four center portions arranged adjacent to each other; and an element portion including two parallel wire portions extending in parallel to each other from two different adjacent center portions and a short circuit portion that short-circuits each of two parallel wire portions at a distal end, wherein: adjacent two of the center portions are physically connected to each other by the element portion; and the element portion extends in substantially the same plane in four directions from the center portions with an angle of 90° therebetween.

The dual polarized folded dipole element may further include a parasitic element arranged on the center portions and a part of the element portion. Here, the parasitic element preferably has a substantially cross shape. A width of each of the two parallel wire portions at the distal end may be smaller than a width of the two parallel wire portions at the center portions. A length from the center portions to the distal end is preferably $\lambda_1/4$, $\lambda_1$ being a wavelength of a lower limit frequency.

The present invention also provides a dual polarized folded dipole antenna including the aforementioned dual polarized folded dipole element.

In other words, the present invention provides a dual polarized folded dipole antenna comprising:

a reflection portion; and at least one dual polarized folded dipole element according to any one of elements as shown above attached to the reflection portion such that the two parallel wire portions of each of the dual polarized folded dipole elements extends from the center portions in a ±45° direction with respect to the polarized wave direction.

The dual polarized folded dipole antenna may further include another radiating element corresponding to a different frequency band from the low band and attached to the reflection portion, the other radiating element is arranged in the polarized wave direction of each of the dual polarized folded dipole elements. Here, the different frequency band is preferably a high band.

The present invention also provides a dual polarized folded dipole antenna including a dual polarized folded dipole element combined with a conventional radiating element corresponding to the same frequency.

In other words, the present invention provides a dual polarized folded dipole antenna comprising:

a reflection portion;

at least one low band radiating element attached to the reflection portion such that each radiating element extends in a horizontal direction and a vertical direction; and the at least one dual polarized folded dipole element arranged adjacent to the at least one low band radiating element at a predetermined element interval and attached to the reflection portion such that the two parallel wire portions of each of the dual polarized folded dipole elements extends in a ±45° direction with respect to the horizontal direction and the vertical direction.

Here, the predetermined element interval is preferably no greater than $0.5\lambda_1$, $\lambda_1$ being a wavelength of a lower limit frequency of the dual polarized folded dipole element.

Advantageous Effects of Invention

The dual polarized dipole element according to the present invention employs a configuration in which the radiating element does not extend in the polarized wave direction unlike the conventional dipole element, and thus, a radiating element for other frequency bands can be arranged in the polarized direction of ±45°. Therefore, the dual polarized dipole element according to the present invention can reduce the electrical influence due to proximity to other radiating elements, and, with the configuration not including the hybrid circuit, has a small difference in directivity by frequency and can provide a favorable characteristic of the coupling amount between polarized waves.

In addition, according to the dual polarized dipole element according to the present invention, in a case of being arranged alternately with the conventional low-band radiating element, dense arrangement with a shorter element interval than that of the conventional low-band radiating element is possible, with the same polarized wave. As a result, the dual polarized dipole element according to the present invention enables inhibition of a grating lobe generated when electrical tilt is applied over a broad band.

BRIEF DESCRIPTION OF THE DRAWINGS

FIG. 17(C) illustrates a simplified electric current distribution in the conventional X-shaped dual polarized dipole element 200 illustrated in FIG. 16(B)

DETAILED DESCRIPTION OF PREFERRED EMBODIMENTS

Figure 1:
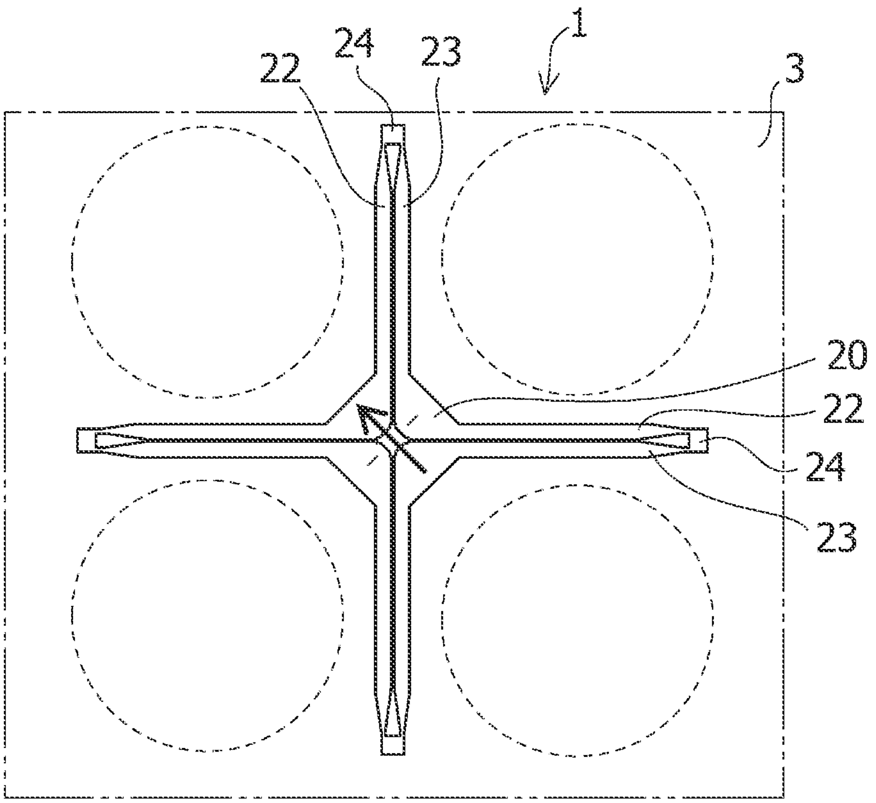
FIG. 1 is a schematic view of a dual polarized folded dipole element 1 as an embodiment of the present invention.

FIG. 1 shows the dual polarized folded dipole element 1 as an embodiment of the present invention. The dual polarized folded dipole element 1 is attached to the reflection portion 3, which is a flat metal plate. The dual polarized folded dipole element 1 includes: four center portions 20 arranged adjacent to each other; and an element portion including two parallel wire portions 22, 23 extending in parallel to each other from two different adjacent center portions 20 and a short circuit portion 24 that short-circuits each two parallel wire portions 22, 23 at a distal end. Here, in the dual polarized folded dipole element 1, the adjacent center portions are physically connected to each other by the four element portions, and each of the element portions extends in substantially the same plane in four directions from the center portions 20 with an angle of 90° therebetween. As described above, the dual polarized folded dipole element 1 in a substantially cross shape as a whole has spaces enabling radiating elements of other frequency bands such as a high band to be arranged in the polarized wave direction (±45° direction) as shown by four round dotted lines in FIG. 1. In addition, the width of each of the two parallel wire portions 22, 23 is reduced in the vicinity of the short circuit portion 24. Due to the widths of the two parallel wire portions 22, 23 being reduced in the vicinity of the short circuit portion 24, impedance matching of the dual polarized folded dipole element 1 is facilitated. Note that, although the reflection portion 3 is a flat metal plate in FIG. 1, the present invention is not limited thereto, and the reflection portion 3 may be metal mesh.

Figure 2A:
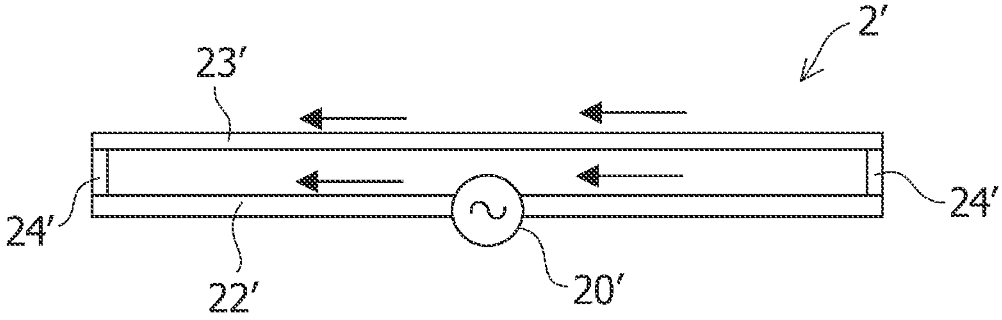
FIG. 2(A) is a schematic view of a typical folded dipole element 2'.

First, with reference to FIG. 2(A), the operation principle of the typical folded dipole element 2' is described, including the center portion 20' with the power feed unit, the two parallel wire portions 22' and 23' extending from the center portion 20' to the distal end, and the short circuit portion 24' that short-circuits the two parallel wire portions 22', 23' at the distal end. Here, in a case in which an interval between the two adjacent parallel wire portions 22' and 23' is sufficiently small compared to the fundamental wavelength of the antenna, the electric current flowing in the two adjacent parallel wire portions 22' and 23' has a characteristic of having the equal phase in each wire and collectively flowing in the two parallel wire portions 22' and 23'. Such a characteristic is disclosed in, for example, pages 77 to 78 of Non-patent Literature 1. The impedance of the typical folded dipole element 2' as described above is about 300Ω.

Figure 2B:
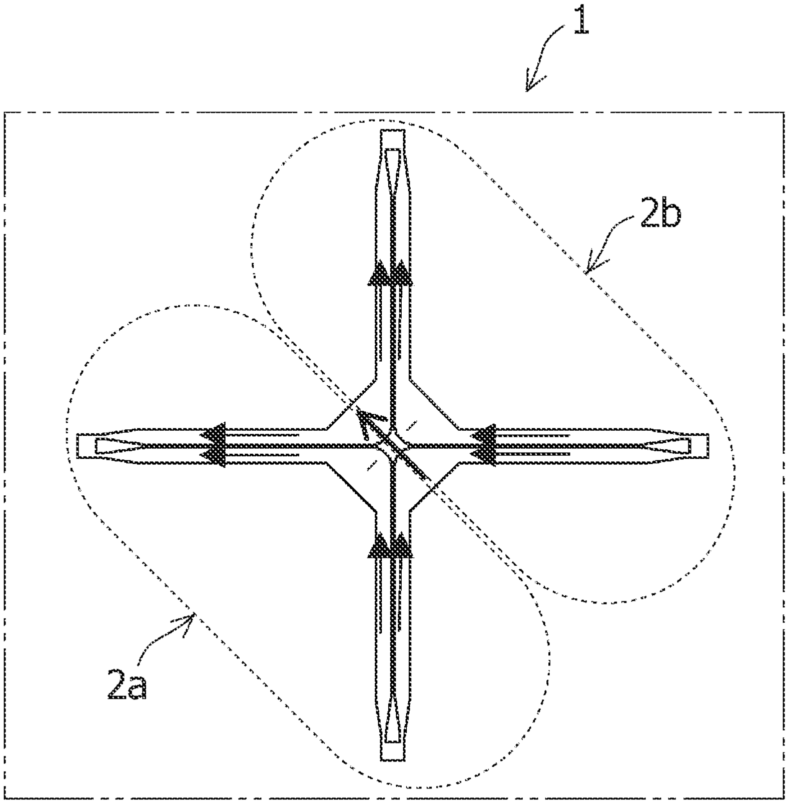
FIG. 2(B) shows an electric current flowing in each of the two parallel wire portions of the dual polarized folded dipole element 1 in a case in which power is fed to the dual polarized folded dipole element 1 in which two L-shaped folded dipole elements 1 and 2 each obtained by deforming a folded dipole element 2' in the center portion are arranged in a substantially cross shape, from the feeding point in the polarized wave direction of 45°.

Next, with reference to FIG. 2(B), an electric current of a polarized wave component flowing in the two parallel wire portions 22, 23 of the dual polarized folded dipole element 1 shown in FIG. 1(A) in a case in which power is fed from the center portion 20 with the polarized wave direction of 45° is described. Here, the dual polarized folded dipole element 1 can be considered separately as two L-shaped folded dipole elements 2*a* and 2*b* each obtained by deforming the folded dipole element 2' shown in FIG. 2(A) into an L-shape in the center portion 20' (each surrounded by a dotted line in FIG. 2(B)). Thus, as indicated by two arrows in FIG. 2(B), the two parallel wire portions 22, 23 of each of the two L-shaped folded dipole elements 2*a* and 2*b* operates to excite. Furthermore, as indicated in FIG. 2(B), the electric current of the polarized wave component flowing in the two parallel wire portions 22, 23 of each of the two L-shaped folded dipole elements 2*a* and 2*b* has equal phase and size, and flows collectively in the two wires. Note that the impedance of the dual polarized folded dipole element 1 is about 200Ω, due to including the two L-shaped folded dipole elements 2*a* and 2*b*.

Figure 3:
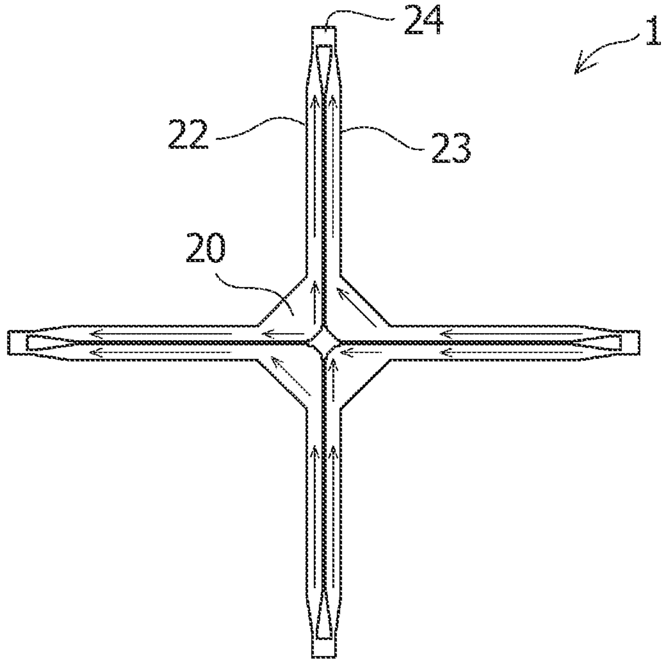
FIG. 3 shows an electric current distribution in the dual polarized folded dipole element 1.

FIG. 3 shows an electric current distribution of the dual polarized folded dipole element 1 in a case in which power is fed in the polarized wave direction, that is, the 45° direction. The dual polarized folded dipole element 1 has a heavy electric current distribution in the same direction over the entire parallel wire portions 22, 23 of the two wires. It can thus be seen that the dual polarized folded dipole element 1 radiates as the whole element.

Figure 4:
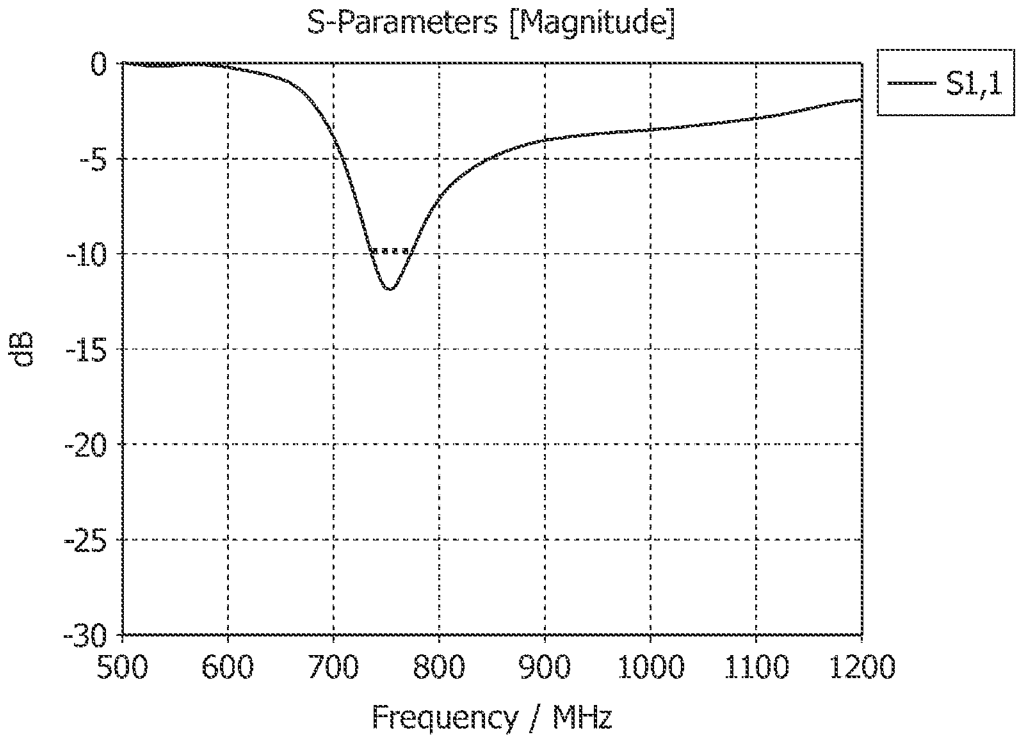
FIG. 4 is a graph showing return loss of the dual polarized folded dipole element 1.

FIG. 4 is a graph showing return loss of the dual polarized folded dipole element 1. With the dual polarized folded dipole element 1, the return loss of no greater than −10 dB (indicated by a dotted line in FIG. 4) is in a range from 740 to 780 MHz, and the fractional bandwidth is 5%.

Figure 5A:
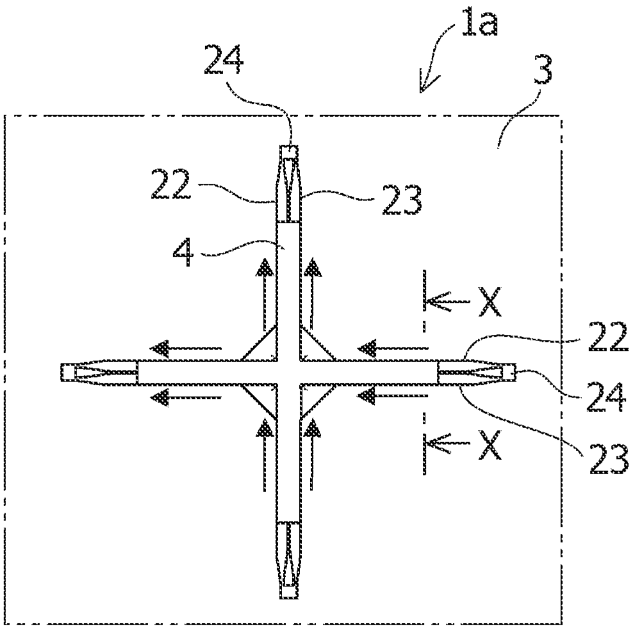
FIG. 5(A) is a schematic view showing another dual polarized folded dipole element 1*a*, which is the dual polarized folded dipole element 1 to which a parasitic element 4 is added.
Figure 5B:
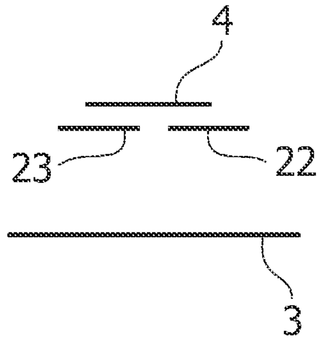
FIG. 5(B) is a cross-sectional view of another dual polarized folded dipole element 1*a* when the cross section shown in FIG. 5(A) is viewed from X direction.

FIG. 5(A) shows another dual polarized folded dipole element 1*a*, which is the dual polarized folded dipole element 1 to which the parasitic element 4 is added. Here, the parasitic element 4 may be a metal plate placed on the center portion 20 of the dual polarized folded dipole element 1 and the parallel wire portions 22, 23 of the two wires. For example, the parasitic element 4 may contain copper or aluminum. In addition, the parasitic element 4 extends from the center portion 20 of the dual polarized folded dipole element 1 to the distal ends of the parallel wire portions 22, 23 of the two wires respectively. The parasitic element 4 thus has a substantially cross shape as a whole. In addition, FIG. 5(B) shows a cross-sectional view of another dual polarized folded dipole element 1*a* when the cross section shown in FIG. 5(A) is viewed from the X direction. The parallel wire portions 22, 23 of the two wires of the dual polarized folded dipole element 1*a* are each arranged between the parasitic element 4 and the reflection portion 3.

Figure 6:
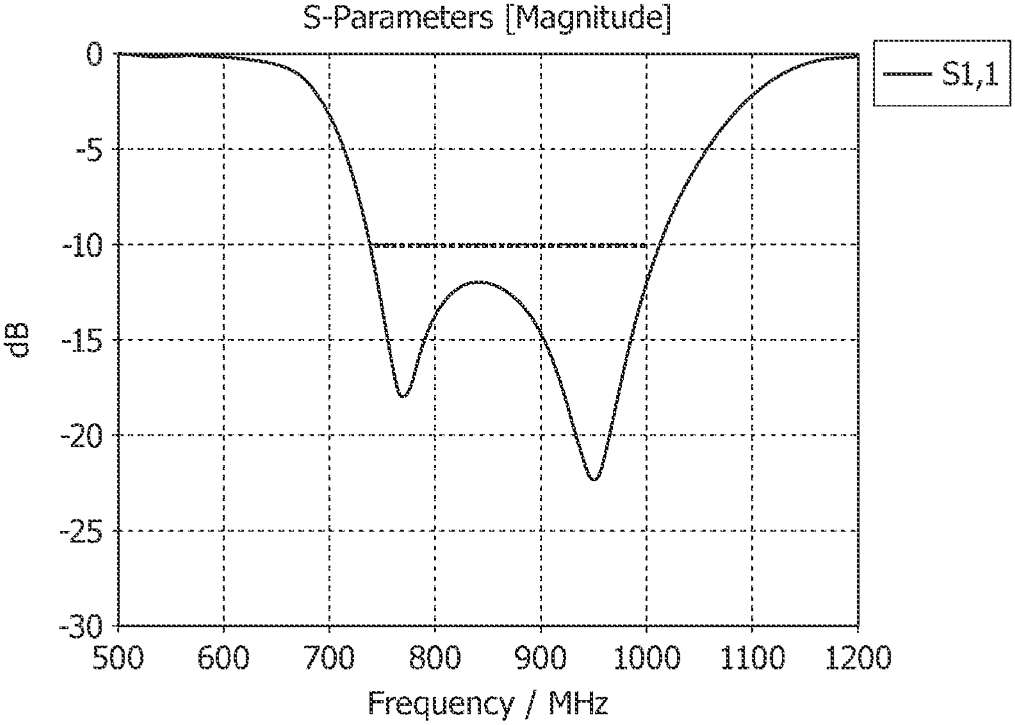
FIG. 6 is a graph showing return loss of another dual polarized folded dipole element 1*a;*
Figure 16A:
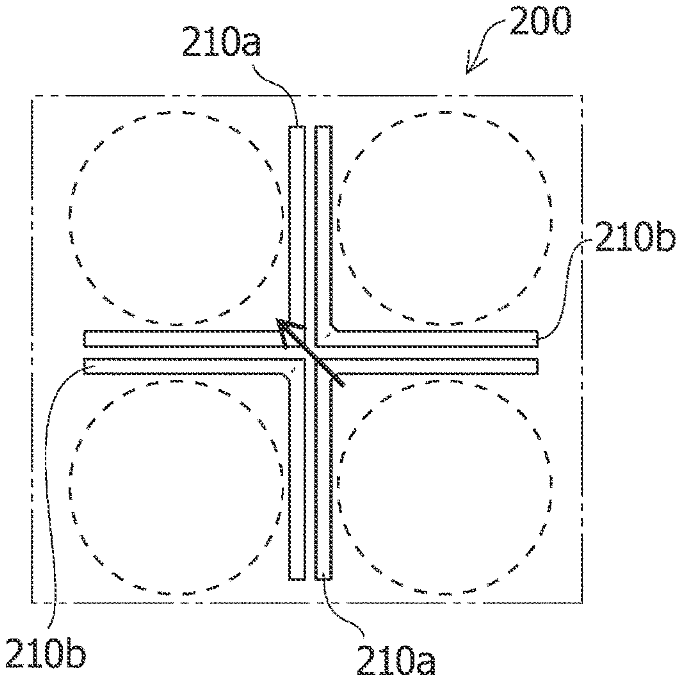
FIG. 16(A) illustrates the conventional X-shaped dual polarized dipole element 200 in which spaces for arranging other radiating elements in the polarized wave direction, that is ±45° direction, are secured, without employing the hybrid circuit.
Figure 16B:
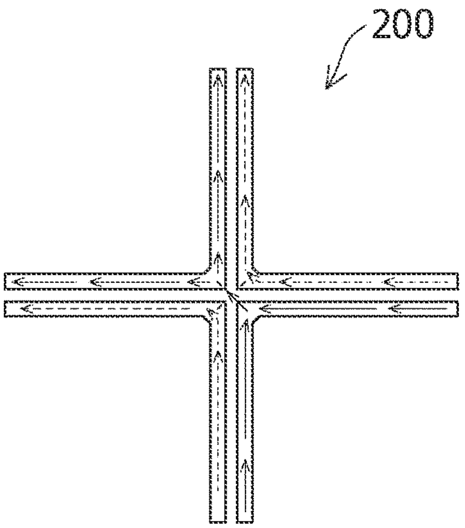
FIG. 16(B) shows an electric current distribution of the conventional X-shaped dual polarized dipole element 200 in a case in which power is fed in the polarized wave direction, that is ±45° direction.
Figure 16C:
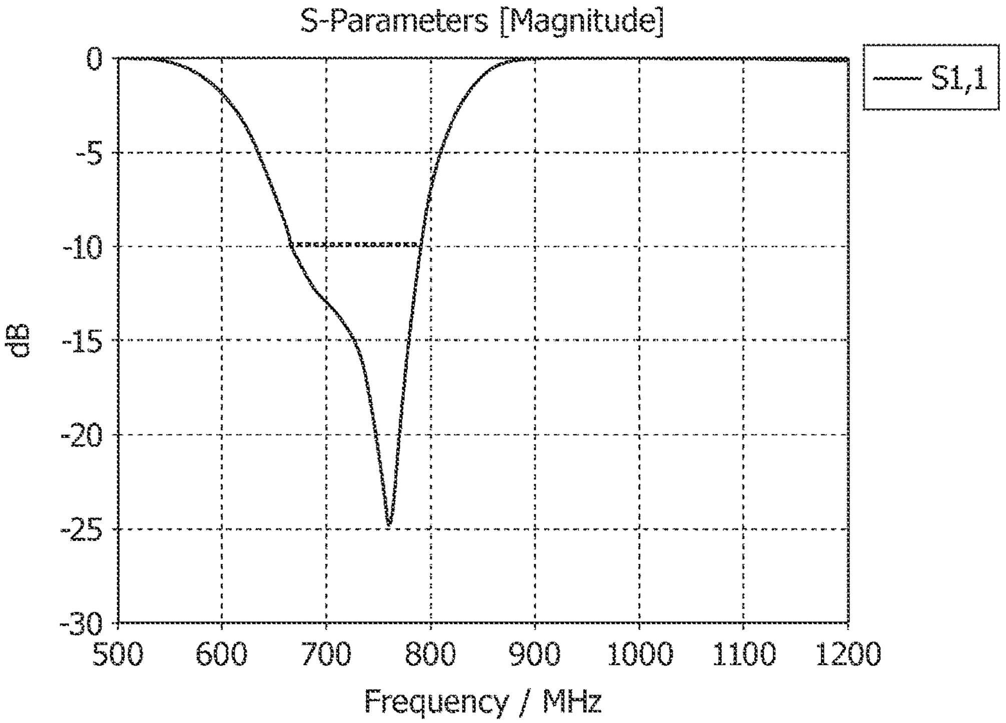
FIG. 16(C) is a graph showing return loss of the conventional X-shaped dual polarized dipole element 200.
Figure 17A:
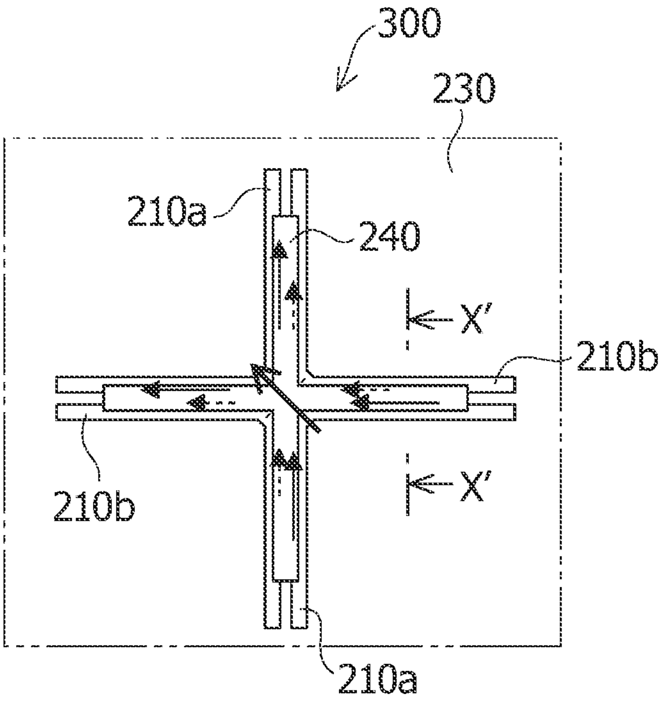
FIG. 17(A) illustrates another conventional X-shaped dual polarized dipole element 300, which is the conventional X-shaped dual polarized dipole element 200 to which the parasitic element 240 is added and a cross-sectional view of the other conventional dual polarized dipole element 300 when the cross section is viewed from the X' direction.
Figure 17A:
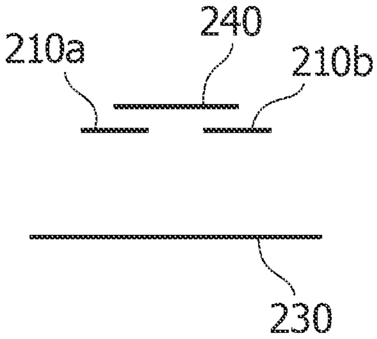
Figure 17B:
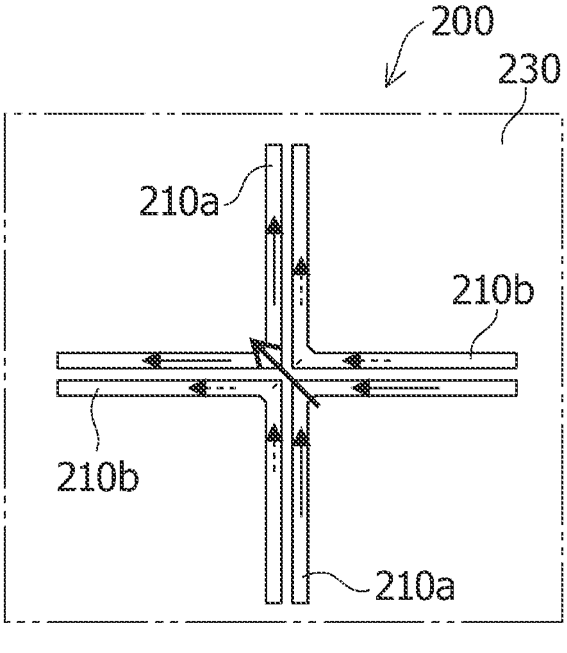
FIG. 17(B) illustrates a simplified electric current distribution in the conventional X-shaped dual polarized dipole element 200 illustrated in FIG. 16(B)
Figure 18:
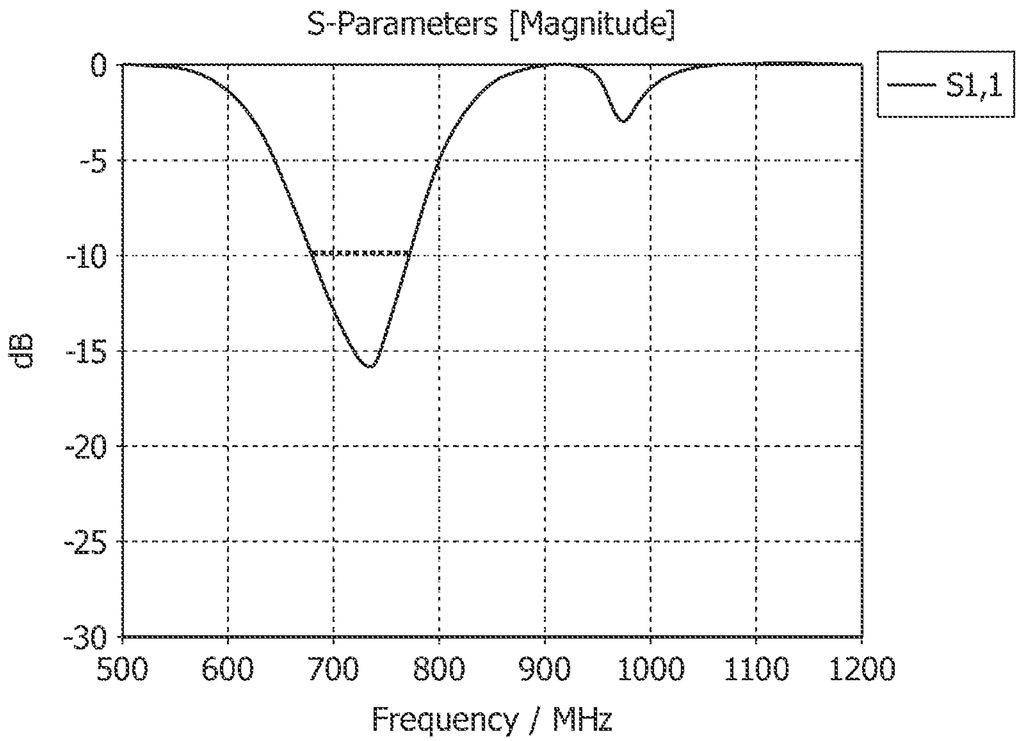
FIG. 18 is a graph showing return loss of the conventional X-shaped dual polarized dipole element 300.

Here, with the other dual polarized folded dipole element 1*a*, the peak position due to the parasitic element 4 (corresponding to the peak position in the vicinity of 970 MHz in FIG. 6) can be adjusted by, for example, adjusting the length of the parasitic element 4 extending to each distal end of the element portion of the dual polarized folded dipole element 1. As illustrated in FIG. 2(B), with the dual polarized folded dipole element 1, the electric current flowing in the two parallel wire portions 22, 23 of each of the two L-shaped folded dipole elements 2*a* and 2*b* has the equal phase and size, and flows collectively in the two wires (in other words, with the dual polarized folded dipole element 1, the undesired wave due to coupling illustrated in FIGS. 16(B) and 17(B) is not generated). The same applies to another dual polarized folded dipole element 1*a* (including the dual polarized folded dipole element 1). As a result, the impedance of the other dual polarized folded dipole element 1*a* can be maintained at a predetermined value with no influence from the aforementioned undesired wave. Note that, the impedance of the other dual polarized folded dipole element 1*a* is changed from 200 n to about 150 n due to adding the parasitic element 4, and matching is easier than in the case without the parasitic element.

FIG. 6 is a graph showing return loss of the other dual polarized folded dipole element 1*a*. With the other dual polarized folded dipole element 1*a*, the return loss of −10 dB is in a range from 760 to 1000 MHz, and fractional bandwidth is 27%, thus achieving broadening of the band. This is considered to be achieved by an increase in the peak due to the parasitic element 4 (peak in the vicinity of 970 MHz in FIG. 6), as a result of resonance obtained between the dual polarized folded dipole element 1 and the parasitic element 4.

Figure 7A:
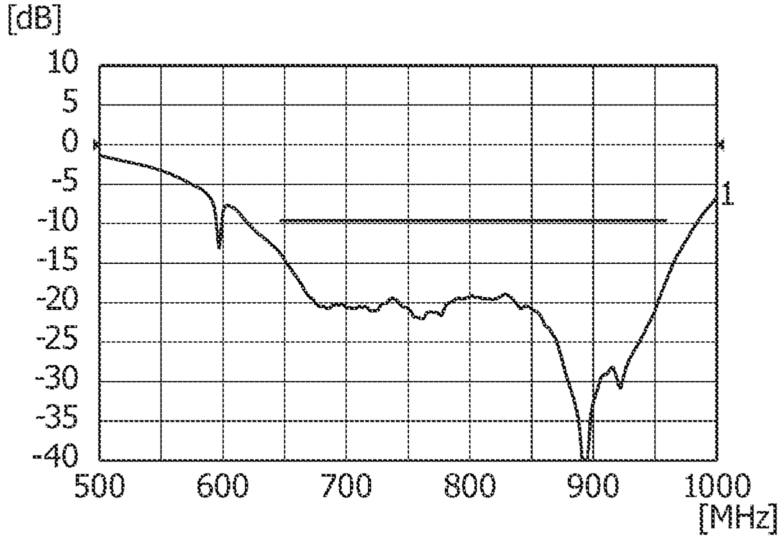
FIGS. 7(A)-(C) are graphs showing the actual measured values of the return loss and of the coupling amount between polarized waves of the other dual polarized folded dipole element 1*a* as an element alone.
Figure 7B:
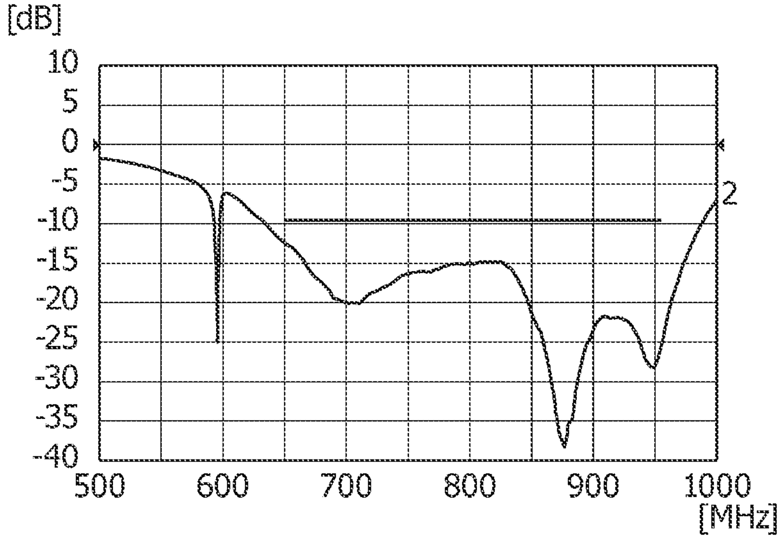
Figure 7C:
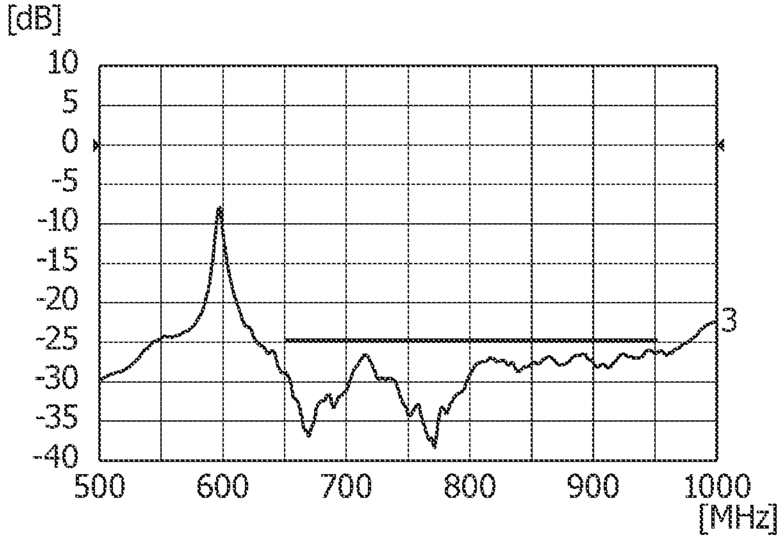

FIGS. 7(A) to 7(C) show the actual measured values of the other dual polarized folded dipole element 1*a* as a single element. Here, FIG. 7(A) is a graph showing the actual measured value of the return loss of the +45° polarized wave of the other dual polarized folded dipole element 1*a* as a single element. In addition, FIG. 7(B) is a graph showing the actual measured value of the return loss of the −45° polarized wave of the other dual polarized folded dipole element 1*a* as a single element. As indicated by a solid line in FIGS. 7(A) and 7(B), with the other dual polarized folded dipole element 1*a* as a single element, a return loss of no greater than −10 dB is in a range from 650 to 950 MHz, and fractional bandwidth is 37%. Furthermore, FIG. 7(C) is a graph showing the actual measured values of the coupling amount between polarized waves of the other dual polarized folded dipole element 1*a* as an element alone. As indicated by a solid line in FIG. 7(C), with the other dual polarized folded dipole element 1*a* as a single element, the return loss of no greater than −10 dB is in a range from 650 to 950 MHz, and the coupling amount between polarized waves is about −25 dB.

In the foregoing, characteristics as elements alone of the dual polarized folded dipole element 1 and the other dual polarized folded dipole element 1*a*, which is the dual polarized folded dipole element 1 to which the parasitic element 4 is added, have been described. Next, with reference to FIGS. 8(A) and 8(B), a dual polarized antenna including different radiating elements corresponding to different frequency bands, such as a low band and a high band, is described.

Figure 8A:
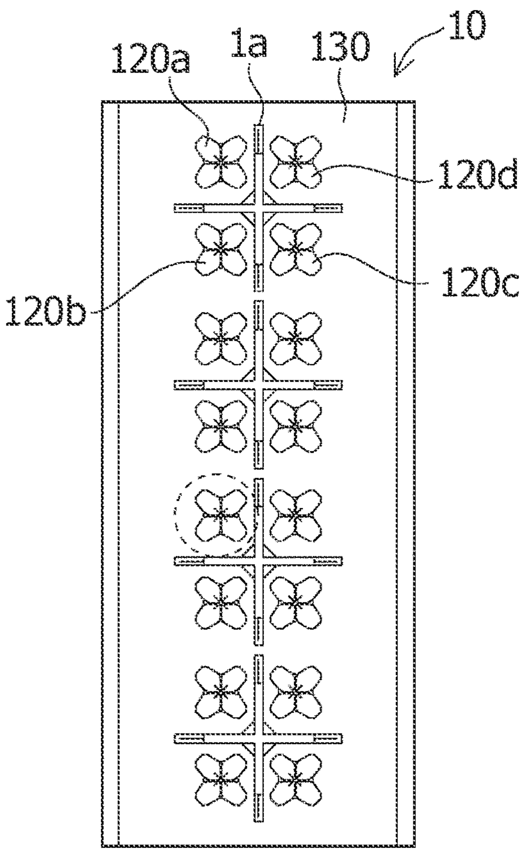
FIG. 8(A) illustrates a dual polarized antenna 10 including a plurality of antenna sets in which the other dual polarized folded dipole element 1*a* and four high-band radiating elements 120*a* to 120*d* arranged in the polarized wave direction are attached to the reflection portion 130.
Figure 8B:
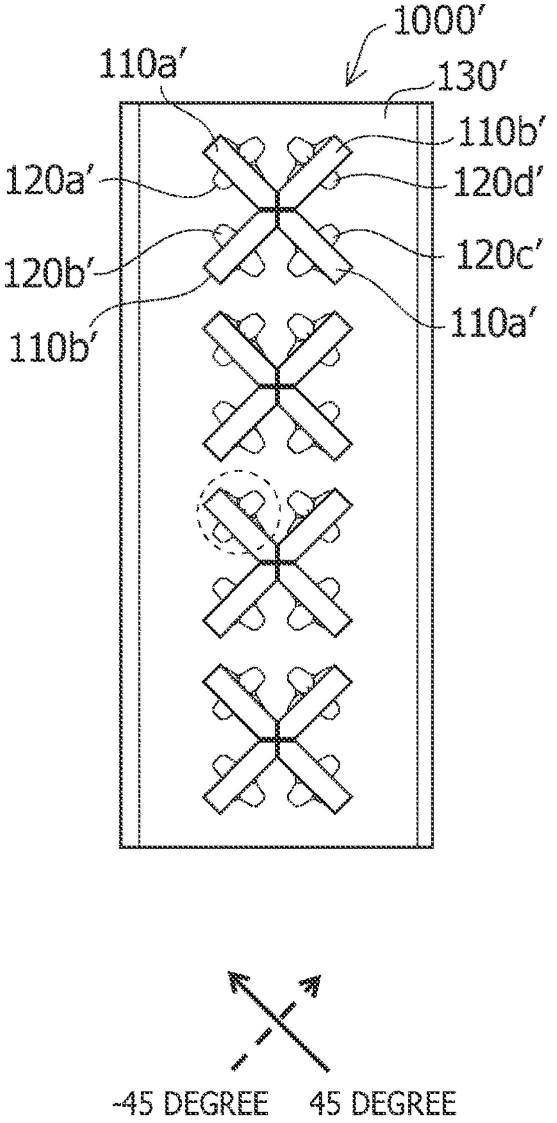
FIG. 8(B) illustrates a conventional dual polarized antenna 1000' including a plurality of antenna sets in which two low-band radiating elements 110*a*' and 110*b*' and four high-band radiating elements 120*a*' to 120*d*', all arranged in the polarized wave direction, are attached to the reflection portion 130'.
Figure 14:
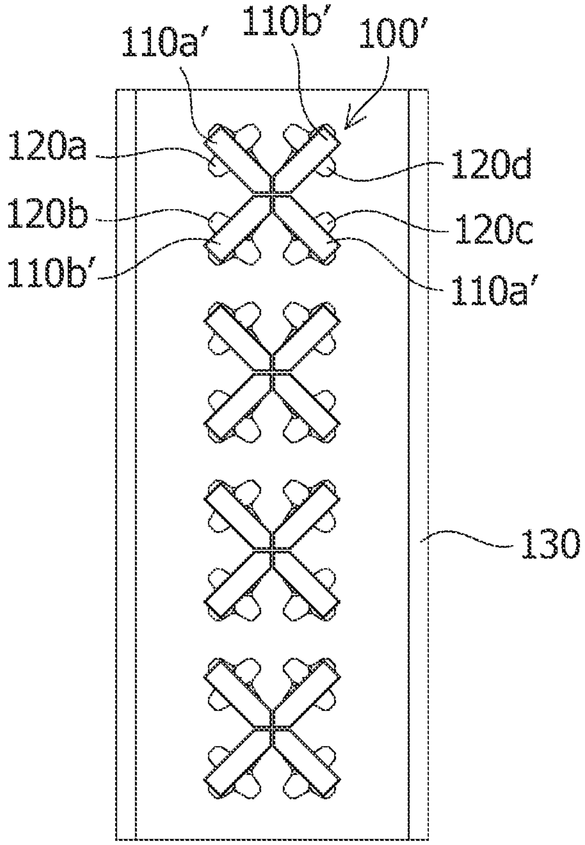
FIG. 14 illustrates an example of the conventional dual polarized antenna including sets of conventional dual polarized antennae each including the conventional dual polarized dipole element 100' and the conventional high-band radiating elements 120*a* to 120*d;*
Figure 15A:
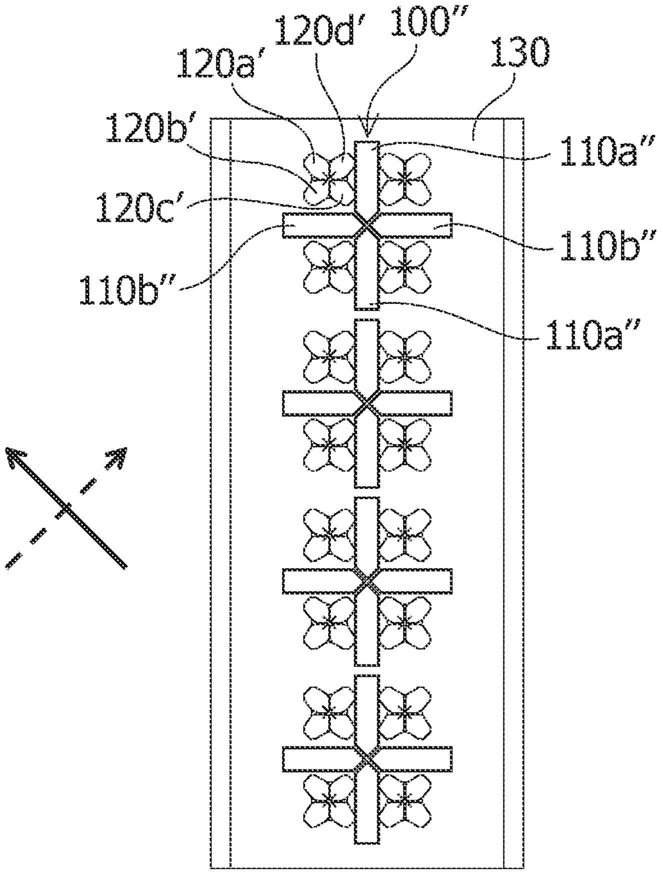
FIG. 15(A) illustrates an example of another conventional dual polarized antenna including sets of other conventional dual polarized antennae in which the conventional low-band radiating elements 110*a*" and 110*b*" do not overlap in the reflection directions of the elements 120*a*' to 120*b*' constituting the conventional high-band radiating element 120*a;*
Figure 15B:
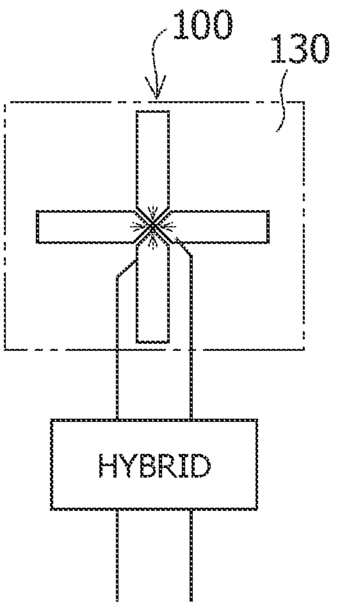
FIG. 15(B) illustrates a hybrid circuit used for inputting a phase of 0° to the conventional low-band radiating element 110*a*" of the other conventional dual polarized antenna shown in (A) and synthesizing to 110*b*" with a phase difference of 180°.

Here, FIG. 8(A) illustrates a dual polarized antenna 10 including a plurality of antenna sets in which the other dual polarized folded dipole element 1*a* shown in FIGS. 5(A) and 5(B) and the four high-band radiating elements 120*a* to 120*d* arranged in the polarized wave direction (in the ±45° direction indicated by two arrows on the lower side of FIG. 8(B)) are attached to the reflection portion 130. In addition, for comparison with the FIG. 8(A), FIG. 8(B) illustrates a conventional dual polarized antenna 1000' including a plurality of antenna sets in which two low-band radiating elements 110*a*' and 110*b*', and four high-band radiating elements 120*a*' to 120*d*', all arranged in the polarized wave direction (in the ±45° direction indicated by two arrows on the lower side of FIG. 8(B)) are attached to the reflection portion 130'. Here, in FIG. 8(B), (as illustrated in FIG. 14) in each set of the conventional dual polarized antenna 1000', the two low-band radiating elements 110*a*' and 110*b*' and the four high-band radiating elements 120*a*' to 120*d*' overlap each other in the radiating direction. As a result, with the dual polarized antenna 1000', the high-band radiating elements 120*a*' to 120*d*' are remarkably affected by interference with the low-band radiating elements 110*a*' and 110*b*'.

Figure 9A:
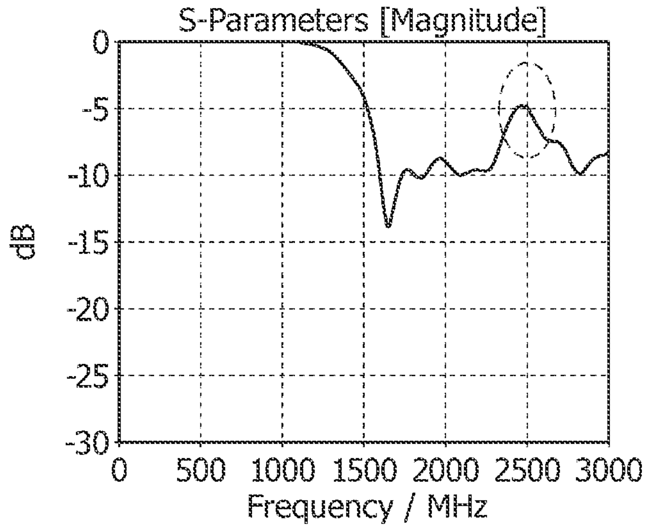
FIG. 9(A) is a graph showing high-band return loss of the conventional configuration shown in FIG. 8(A)
Figure 9B:
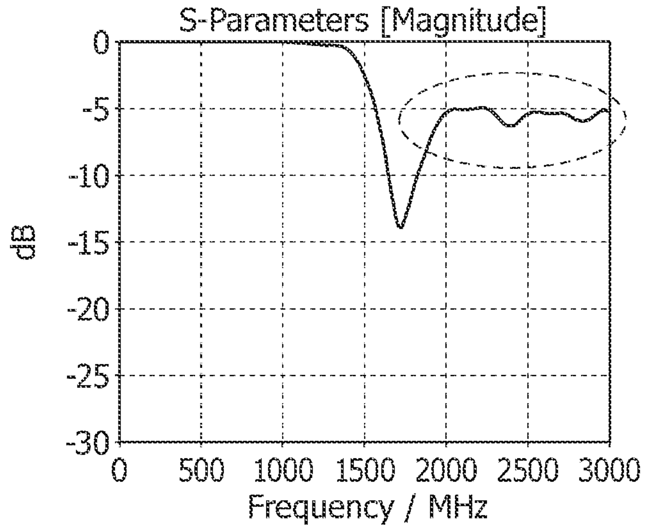
FIG. 9(B) is a graph showing high-band return loss of the configuration in which a parasitic element is added to the dual polarized folded dipole element according to the present invention shown in FIG. 8(B) corresponding to the low band (900 MHz band)
Figure 9C:
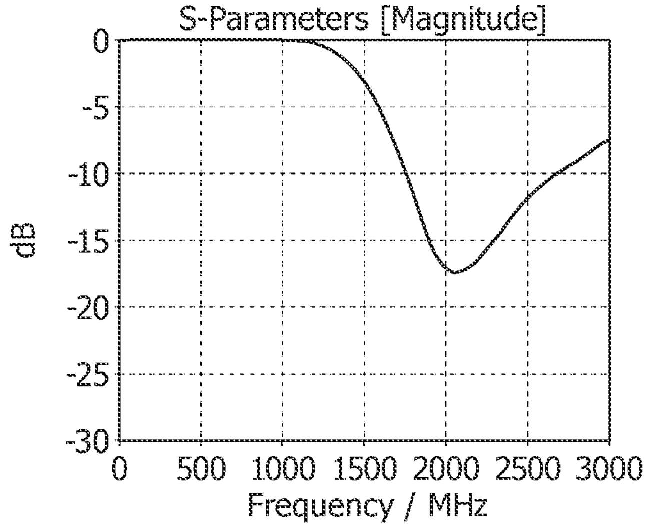
FIG. 9(C) is a graph showing return loss of the configuration with only the high-band radiating elements, that is the configurations of FIGS. 8(A) and 8(B) without the low-band radiating elements.

Next, FIGS. 9(A) and 9(B) show graphs of comparison of return loss regarding the high-band radiating elements, each surrounded by a dotted line in FIGS. 8(A) and 8(B) (both being the fifth high-band radiating element from the top in the left column) when power is fed with a +45° polarized wave. FIG. 9(A) is a graph showing return loss, as an element alone, of the high-band radiating element surrounded by the dotted line in FIG. 8(A). The return loss of such a high-band radiating element is affected by the low-band radiating element in the vicinity of 2.5 GHz (surrounded by a dotted line in FIG. 9(A)), but the influence of the low-band radiating element is reduced in other frequency bands. On the other hand, FIG. 9(B) is a graph showing return loss, as an element alone, of the high-band radiating element surrounded by the dotted line in FIG. 8(B). The return loss of such a high-band radiating element is affected by the low-band radiating element over a range from 2 GHz to 3 GHz (surrounded by a dotted line in FIG. 9(B)). Note that FIG. 9(C) is, for comparison, a graph showing return loss of the antenna set with only the high-band radiating elements, that is the conventional dual polarized antenna 1000' shown in FIG. 8(B) without the low-band radiating elements. Here, comparing the range from 2 GHz to 3 GHz of FIGS. 9(A) and 9(C) with the range from 2 GHz to 3 GHz of FIGS. 9(B) and 9(C), the return loss characteristic of FIG. 9(A) is closer to the return loss characteristic of FIG. 9(C)

than to the return loss characteristic of FIG. 9(B). In other words, with the dual polarized antenna set 10 shown in FIG. 8(A), influence from the low-band radiating element, that is, the influence to the coupling amount, is reduced compared to the conventional antenna set 1000' in FIG. 8 (B).

Figure 10A:
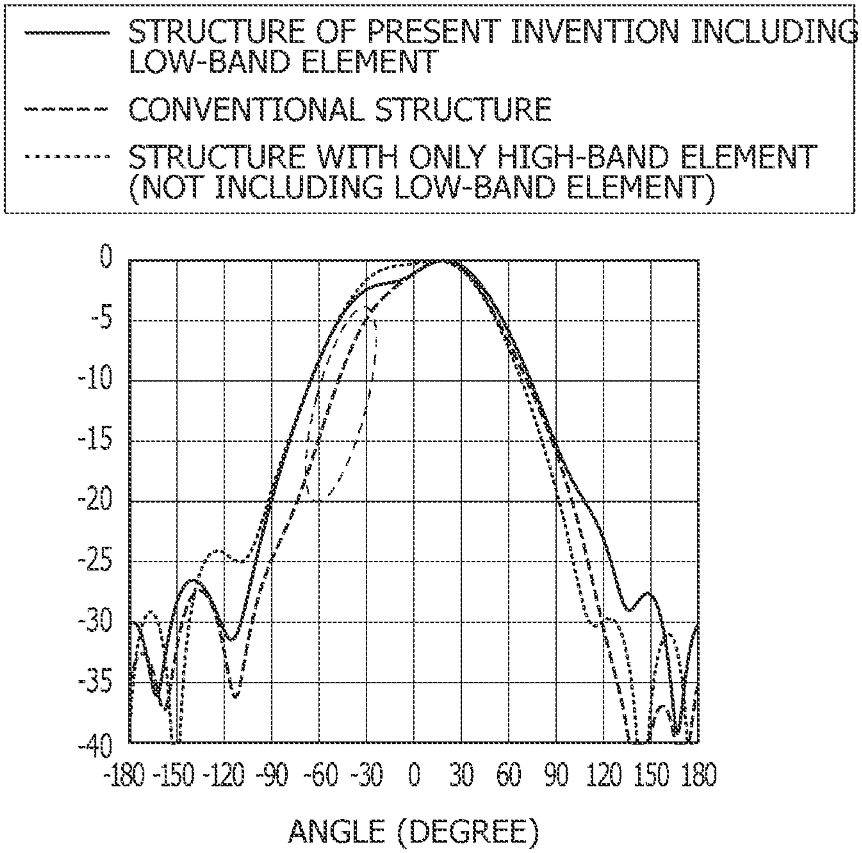
FIG. 10(A) is a graph showing the horizontal plane directivity in the high-band (2000 MHz band) regarding the conventional configuration in FIG. 8(A) and the configuration of the present invention in FIG. 8(B)
Figure 10B:
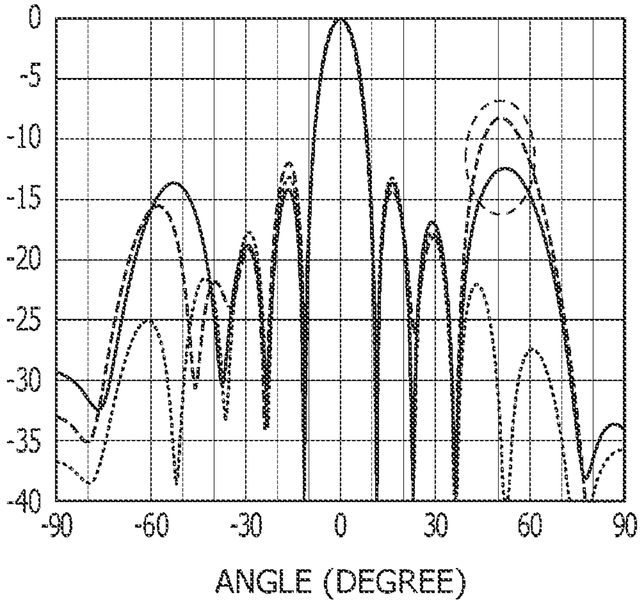
FIG. 10(B) is a graph showing the vertical plane directivity in the high-band (2000 MHz band) regarding the conventional configuration in FIG. 8(A) and the configuration of the present invention in FIG. 8(B)

FIG. 10(A) is a graph showing the horizontal plane directivity in the high-band (2000 MHz band) regarding the dual polarized antenna 10 in FIG. 8(A) and the conventional dual polarized antenna 1000' in FIG. 8(B). FIG. 10(B) is a graph showing the vertical plane directivity in the high-band (2000 MHz band) regarding the dual polarized antenna 10 in FIG. 8(A) and the conventional dual polarized antenna 1000' in FIG. 8(B). Note that, for comparison, FIGS. 10(A) and 10(B) show, by dotted lines, the horizontal plane directivity and the vertical plane directivity in a high band (2000 MHz band) regarding the configuration in which all the low-band radiating elements are removed from the conventional dual polarized antenna 1000' in FIG. 8(B). With the dual polarized antenna 10 shown by the solid line in FIGS. 10(A) and 10(B), deterioration of the horizontal plane directivity and the vertical plane directivity is reduced, compared to the conventional dual polarized antenna 1000' shown by the dotted line in FIGS. 10(A) and 10(B). In particular, with the dual polarized antenna 10, deterioration of the horizontal plane directivity and the vertical plane directivity is reduced compared to the conventional dual polarized antenna 1000' in the vicinity of 30° to 90° surrounded by the dotted line in FIG. 10(A) and in the vicinity of 45° to 60° surrounded by the dotted line in FIG. 10(B). Note that, comparing the configuration in which all the low-band radiating elements are removed from the conventional dual polarized antenna 1000' (shown by the dotted line in FIGS. 10(A) and 10(B)) with the conventional dual polarized antenna 1000', it can be seen that the conventional dual polarized antenna 1000' is affected by the low-band radiating elements in terms of the horizontal plane directivity and the vertical plane directivity.

Figure 11A:
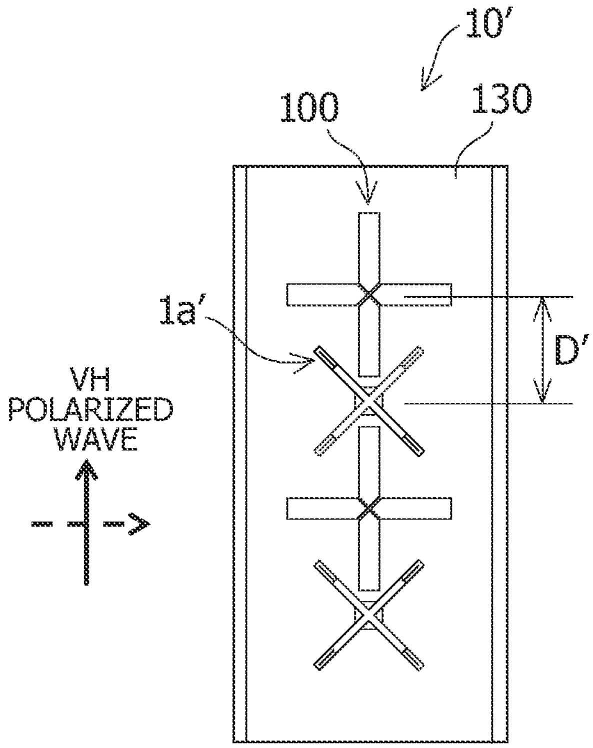
FIG. 11(A) illustrates an antenna 10' as an embodiment of the present invention in which the conventional low-band radiating element 100 arranged in horizontal and vertical polarized wave directions and another dual polarized folded dipole element 1*a*' arranged at 45° with respect to the VH horizontal and vertical polarized wave directions are alternately arranged at an element interval D'.
Figure 11B:
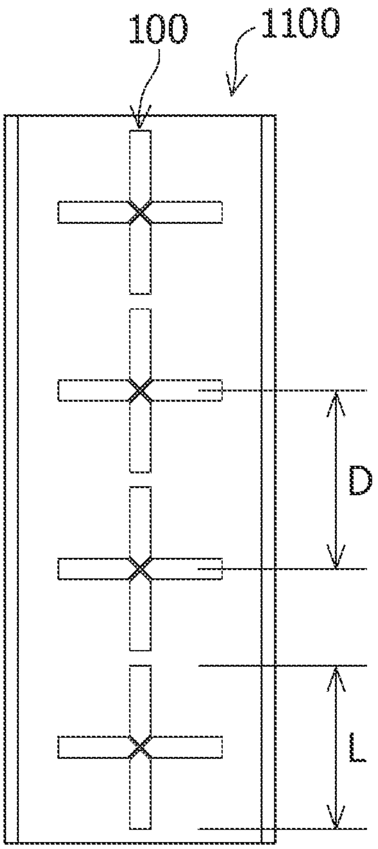
FIG. 11(B) illustrates a conventional antenna 1100 including a plurality of conventional low-band radiating elements 100 arranged in the horizontal and vertical polarized wave directions at an element interval D.

Next, with reference to FIGS. 11(A) and 11(B), an antenna including a plurality of radiating elements corresponding to predetermined frequency bands, such as a low band in the horizontal and vertical polarized waves (VH polarized wave sharing) is described. Typically, as shown in FIG. 11(B), an element length L of the conventional radiating element 100 is preferably about $0.5\lambda_1$, $\lambda_1$ being the wavelength of the lower limit wavelength. For this reason, in the horizontal and vertical polarized waves, in the case of the antenna including a plurality of the same radiating elements corresponding to a predetermined frequency band, an element interval D of the radiating elements needs to be about $0.5\lambda_1$, similar to the element length L as shown in FIG. 11(B), in order to avoid mechanical contact between the radiating elements.

Note that, while the element interval D from the viewpoint of the wavelength $\lambda_1$ of the lower limit frequency is about $0.5\lambda_1$, the element interval D from the viewpoint of the wavelength $\lambda_2$ of the upper limit frequency is greater than 0.5 in the wavelength ratio. For example, in the case in which the frequency band is 700 to 1000 MHz (fractional bandwidth: 35%), the wavelength $\lambda_1$ of the lower limit frequency is 700 MHz (wavelength $\lambda_1$: 428 mm) and the wavelength $\lambda_2$ of the upper limit frequency is 1000 MHz (wavelength $\lambda_2$: 300 mm). Given this, the element length L (L=220 mm) of the radiating element can be represented by using the wavelength $\lambda_1$ and the wavelength $\lambda_2$ as $0.51\lambda_1$ or $0.73\lambda_2$. In other words, it is to be noted that in the case of a broad band, the higher the frequency of the fractional bandwidth is, the element interval L represented by the wavelength $\lambda_2$ of the upper limit frequency increases by the wavelength ratio with the wavelength $\lambda_1$ of the lower limit frequency.

FIG. 11(A) illustrates an antenna 10' as an embodiment of the present invention in which the conventional low-band radiating element 100 arranged in horizontal and vertical polarized wave directions and another dual polarized folded dipole element 1*a'* arranged at 45° with respect to the horizontal and vertical polarized wave directions are alternately arranged at an element interval D'. On the other hand, FIG. 11(B) illustrates a conventional dual polarized antenna 1100 including a plurality of conventional low-band radiating elements 100 arranged in the horizontal and vertical polarized wave directions at an element interval D. In the dual polarized antenna 10' in FIG. 11(A), the other dual polarized folded dipole element 1*a'* is arranged at 45° with respect to the horizontal and vertical polarized wave directions, the element interval D' in FIG. 11(A) can thus be smaller than the element interval D in FIG. 11(B). In other words, in the dual polarized antenna 10' in FIG. 11(A), the low-band radiating elements can be arranged more densely on the reflection portion 130 than in the conventional dual polarized antenna 1100 in FIG. 11(B). As a result, the dual polarized antenna 10' in FIG. 11(A) can inhibit a grating lobe over a broad band. Note that, the fact that arranging the plurality of low-band radiating elements with a small element interval (in other words, densely arranging) can inhibit a grating lobe is described with reference to FIG. 12.

Figure 12:
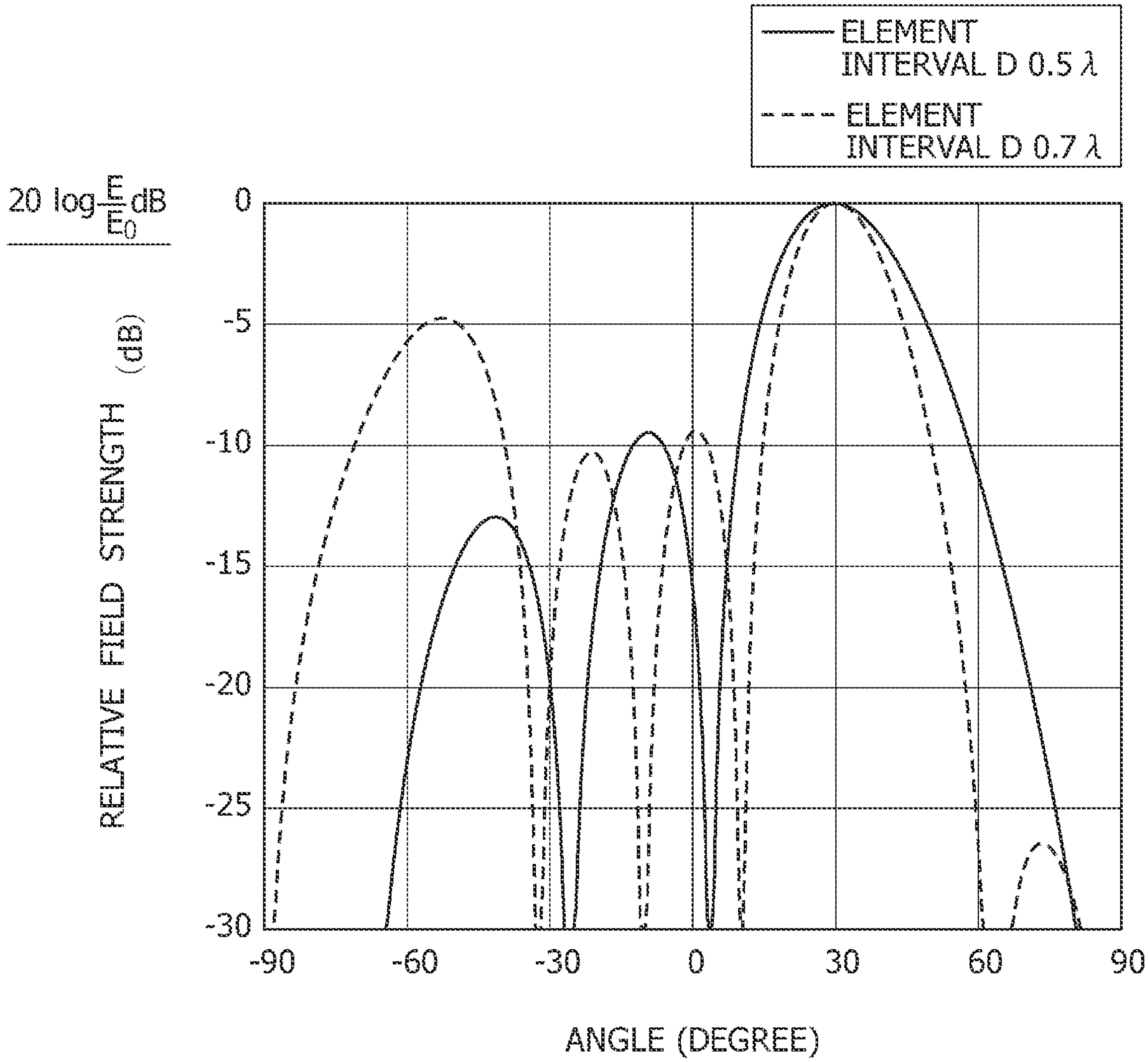
FIG. 12 is a graph showing a difference in generated grating lobes between the cases of arranging the four radiating elements with the element intervals 0.5λ and 0.7λ respectively, in a case in which a phase with electrical tilt of 30° is fed to each element and λ is a wavelength of the lower limit frequency.
Figure 13A:
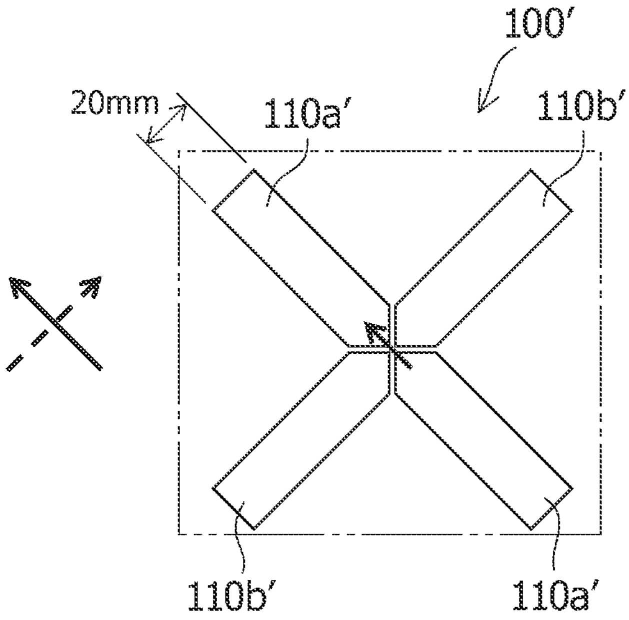
FIG. 13(A) illustrates an example of the conventional dual polarized dipole element 100'.
Figure 13B:
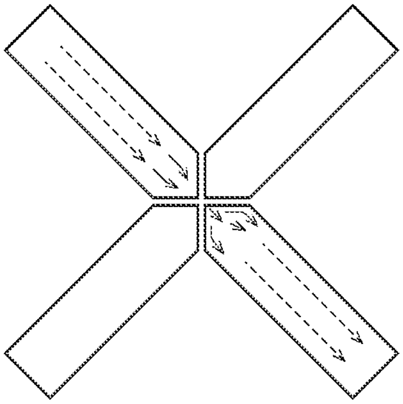
FIG. 13(B) shows an electric current distribution in a case in which power is fed to the conventional dual polarized dipole element 100'.
Figure 13C:
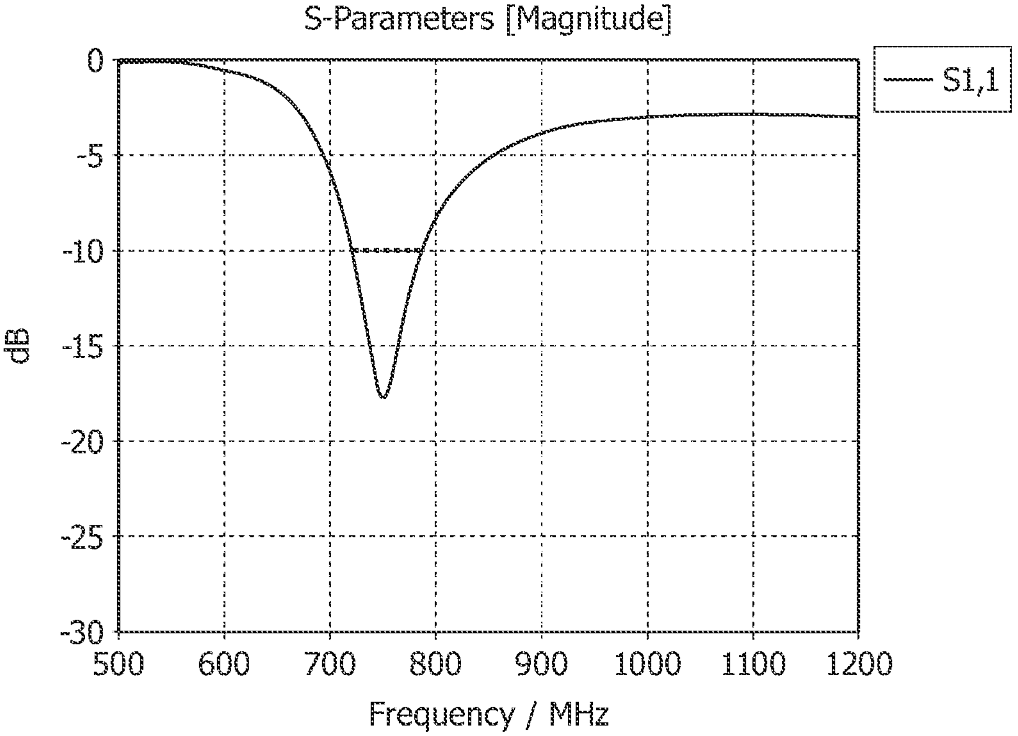
FIG. 13(C) illustrates return loss of the conventional dual polarized dipole element 100'.

FIG. 12 is a graph showing a difference in generated grating lobes between the cases of arranging the same four low-band radiating elements with the element intervals 0.5λ and 0.7λ respectively, in a case in which a phase with electrical tilt of 30° is fed to each element and X is a wavelength of the lower limit frequency. FIG. 12 indicates that more grating lobes are generated in a direction different from that of the main lobe in the vicinity of +30° in the case in which the element interval is 0.7λ, than in the case of 0.5λ. In other words, the shorter element interval (denser arrangement) of the low-band radiating elements inhibits generation of a grating lobe. Note that such a level of the grating lobe is increased by applying a greater electric tilt.

INDUSTRIAL APPLICABILITY

The present invention has been described in terms of examples of a base station antenna of a mobile communication system and the like. However, one of ordinary skill in the art will understand that the present invention is not limited to such a base station antenna of a mobile communication system and the like, and may be applied to an antenna of any intended usage.

REFERENCE SIGNS LIST

1 Dual polarized folded dipole element
1*a* Another dual polarized folded dipole element
20 Center portion
22, 23 Parallel wire portion
24 Short circuit portion
3, 130, 130' Reflection portion
4, 240 Parasitic element
10, 10' Dual polarized antenna
100, 100', 100" Dual polarized dipole element (Conventional example)
110*a'* to 110*d'*, 110*a"* to 110*d"* Low band radiating element (Conventional example)

What is claimed is:

1. A dual polarized folded dipole element comprising:

four center portions arranged adjacent to each other; and an element portion including two parallel wire portions extending in parallel to each other from different adjacent two of the center portions and a short circuit portion that short-circuits each of the two parallel wire portions at distal ends;

wherein two adjacent center portions are physically connected to each other by the element portion, the element portion extends in substantially the same plane in four directions from the center portions with an angle of 90° therebetween, and wherein a width of each of the two parallel wire portions at the distal end is smaller than a width of each of the two parallel wire portions at the center portions, and the width of each of the two parallel wire portions in the vicinity of the short-circuit is narrower in accordance with approaching the short-circuit.

2. The dual polarized folded dipole element according to claim 1, further comprising a parasitic element arranged on a part of the center portions and a part of the element portion.

3. The dual polarized folded dipole element according to claim 2, wherein the parasitic element has a substantially cross shape.

4. The dual polarized folded dipole element according to claim 1, wherein a length from the center portions to the distal end is $\lambda_1/4$, $\lambda_1$ being a wavelength of a lower limit frequency.

5. A dual polarized folded dipole antenna comprising:

a reflection portion; and a dual polarized folded dipole element comprising:

four center portions arranged adjacent to each other; and an element portion including two parallel wire portions extending in parallel to each other from different adjacent two of the center portions and a short circuit portion that short-circuits each of the two parallel wire portions at distal ends;

wherein two adjacent center portions are physically connected to each other by the element portion, the element portion extends in substantially the same plane in four directions from the center portions with an angle of 90° therebetween, wherein a width of each of the two parallel wire portions at the distal end is smaller than a width of each of the two parallel wire portions at the center portions, and the width of each of the two parallel wire portions in the vicinity of the short-circuit is narrower in accordance with approaching the short-circuit; and wherein the dual polarized folded dipole element is attached to the reflection portion such that the parallel wire portion of each of the dual polarized folded dipole elements extends from the center portions in a ±45° direction with respect to a polarized wave direction.

6. The dual polarized folded dipole antenna according to claim 5, further comprising a radiating element corresponding to a different frequency band from low band and attached to the reflection portion, wherein the radiating element is arranged in the polarized wave direction of each of the dual polarized folded dipole elements.

7. The dual polarized folded dipole antenna according to claim 6, wherein the different frequency band is a high band.

8. A dual polarized folded dipole antenna comprising:

a reflection portion;

at least one low band radiating element attached to the reflection portion such that each radiating element extends in a horizontal direction and a vertical direction; and at least one dual polarized folded dipole element comprising:

four center portions arranged adjacent to each other; and an element portion including two parallel wire portions extending in parallel to each other from different adjacent two of the center portions and a short circuit portion that short-circuits each of the two parallel wire portions at distal ends;

wherein two adjacent center portions are physically connected to each other by the element portion, the element portion extends in substantially the same plane in four directions from the center portions with an angle of 90° therebetween, wherein a width of each of the two parallel wire portions at the distal end is smaller than a width of each of the two parallel wire portions at the center portions, and the width of each of the two parallel wire portions in the vicinity of the short-circuit is narrower in accordance with approaching the short-circuit; and wherein the at least one dual polarized folded dipole element is arranged adjacent to the at least one low band radiating element at a predetermined element interval and attached to the reflection portion such that the two parallel wire portions of each of the dual polarized folded dipole elements extends in a ±45° direction with respect to the horizontal direction and the vertical direction.

9. The dual polarized folded dipole antenna according to claim 8, wherein the predetermined element interval is no greater than $0.5\lambda_1$, $\lambda_1$ being a wavelength of a lower limit frequency of the dual polarized folded dipole element.

* * * * *